United States Patent [19]

De Haeck

[11] 4,016,399

[45] Apr. 5, 1977

[54] FLUX-CORED WIRE FOR ELECTRIC ARC WELDING OF SOFT STEELS OR LOW-ALLOYED STEELS

[75] Inventor: Robert De Haeck, St. Pieters-Kapelle, Belgium

[73] Assignee: La Soudure Electrique Autogène, Procedes Arcos, Anderlecht, Belgium

[22] Filed: June 17, 1975

[21] Appl. No.: 587,554

[30] Foreign Application Priority Data

June 17, 1974 Belgium .......................... 145490

[52] U.S. Cl. .................... 219/146; 148/24; 148/26
[51] Int. Cl.$^2$ ........................... B23K 35/22
[58] Field of Search .......... 148/24, 26; 219/145, 219/146

[56] References Cited

UNITED STATES PATENTS

| | | | |
|---|---|---|---|
| 3,152,019 | 10/1964 | Shrubsall | 148/26 |
| 3,539,765 | 11/1970 | Duttera et al. | 219/146 |
| 3,760,146 | 9/1973 | Rozet | 219/146 |
| 3,769,099 | 10/1973 | DeLong et al. | 219/146 X |
| 3,787,658 | 1/1974 | Kammer et al. | 219/146 |
| 3,805,016 | 4/1974 | Soejima et al. | 219/146 |

Primary Examiner—J. V. Truhe
Assistant Examiner—N. D. Herkamp
Attorney, Agent, or Firm—Jackson, Jackson and Chovanes

[57] ABSTRACT

Flux-cored wire for automatic or semi-automatic arc welding process, comporting specific powder compositions as detailed in the description, which are high in amounts of metallic powders, mixed with metallic silicate solution to form a paste and baked before its introduction within a low-carbon or low-alloy steel sheath.

10 Claims, No Drawings

FLUX-CORED WIRE FOR ELECTRIC ARC WELDING OF SOFT STEELS OR LOW-ALLOYED STEELS

DESCRIPTION OF INVENTION

The invention relates to a flux-cored wire for the automatic or semi-automatic electric arc welding of low-carbon or low-alloyed steels, such flux-cored wires being intended to be used in open are welding as well as in welding under protection of inert gases, of carbon dioxide $CO_2$ or of a mixture of both with possible addition of oxygen.

The use of flux-cored wires in electric arc welding under such conditions is a known technique, and the use of powdery mixtures of basic character, called "low hydrogen type", is also well known, with substantial addition of metal to fill the steel sheaths composing said wires.

Such wires produce weld deposits having high mechanical properties, hardness and impact strength, and in the particular case of low-alloyed steels they supply a high equivalent in carbon without underlaying cracks.

Welding arcs obtained with these wires have the drawback of being "crackling," that is to say throwing spatter sticking to the base metal; this trouble is intensified with higher welding current, reducing therefore the hourly output to rates incompatible with modern productivities.

The wires as per the invention consist, as is well known, of the strip of steel rolled in tubular shape, optionally with internal folds, (Belgian Patents 550,612 and 777,588), filled, with fluxes of suitable composition, properly treated, and the tubes are reduced to the usual sizes for welding (3.2; 2.4; 2; 1.6; 1.2 millimeters of diameter). Said wires permit maintaining a smooth fusion with relatively high currents, i.e., in much improved conditions of efficiency and output, with weld beads having high and constant mechanical properties along their entire length.

Such results have been obtained in an unexpected manner:

1. by the bringing together into a paste of mixtures of known powders (alkaline-earth carbonates, fluorides, ferrometallic deoxidizers, arc stabilizers, low-alloyed or unalloyed iron powder, etc.) bound with soluble silicates (sodium silicate preferably) at 30° Beaume (4 to 12 grams of silicates for 100 grams of mixture), to form pastes by the mixing of the powder mixture with the solution of soluble silicate.
2. by heating the pastes so obtained to 600° C and keeping them at that temperature for 2 hours at least.
3. by introducing then the pastes into the steel sheaths.

Furthermore, it has been observed that the mere addition, without producing a paste, of lower amounts (1 to 3% by weight of powder) of atomized silicates to the specific powder mixtures, followed by a heat treatment at 600° C during 2 hours and by sifting at 100 mesh, supplies a flux giving a tranquil arc as per the invention.

These wires are therefore characterized by:
a. particular compositions of the powdery mixtures used as flux filling, namely:
   50 to 85% of iron powders (low-alloyed or unalloyed)
   4 to 8% of Fe Mn (refined)
   2 to 8% of Fe Si (45% Si)
   10 to 20% of Ca $F_2$
   0 to 6% of Ca $CO_3$
   0 to 2% of $SiO_2$ or $Al_2 O_3$ or potassium feldspar
   0 to 2% of potassium titanate
in which
   the Ca $CO_3$ can be replaced (up to 5% of the total weight of the powdery mixture) by other alkaline-earth carbonates, or by MgO and/or with Ca $F_2$ replaced by NaF (up to 10% of the powdery mixture) and/or with Fe Si replaced by Ca Si (up to 7% of the total weight of the powdery mixture); all diluted in 4 to 12% of soluble silicates at 30° Beaume (sodium silicate preferably) for 100 grams of mixture, or additioned with 1 to 3 grams of atomized silicate for 100 grams of mixture;
b. baking during 2 hours at 600° C after agglomeration in the case of soluble silicates (not atomized);
c. filling rates of 30 up to 60 grams of powder for 100 grams of strip.

Electrodes of the type claimed by the present invention (1.6 millimeter diameter) have been manufactured, under the Trademark of Arcosarc with the following elected powder mixture:

| | |
|---|---|
| Iron powder | 65.5 % |
| Refined Fe Mn | 6 % |
| Fe Si (45% Si) | 7.5 % |
| Ca F2 | 13 % |
| Ca CO3 | 6 % |
| Si O2 | 1.5 % |
| Potassium titanate | 0.5 % | used under the following welding conditions:

| | |
|---|---|
| 360 Amperes - | negative pole to the electrode |
| 30 Volts | |
| Welding speed: | 35 cm/min. |

They deposited beads having remarkable mechanical properties:

| | |
|---|---|
| Yield strength | 45 Kg/mm2 |
| Tensile strength | 55 Kg/mm2 |
| Elongation | 29% |
| Area reduction | 66% |
| Charpy impact strength | |
| at −20° C | 12.2 Kgm/cm2 |
| at −40° C | 10.5 Kgm/cm2 | with a production of 8.64 Kgm per hour.

As will be evident from the rest of this application for patent as originally filed, this invention includes flux-cored wire for automatic or semi-automatic electric arc welding of low-carbon or low-alloy steels as produced by a particular process as follows, as well as also thereby the following process itself:

A mixture of powders of the following compositions by weight is prepared:
  46 – 84% of iron powder (containing zero alloy to a maximum of 10% of the total weight of all powders of alloy)
  4 – 8% of refined ferromanganese (minimum of 80% Mn to maximum 85% Mn)
  2 – 8% of ferrosilicon having 45% silicon
  10 – 20% of calcium fluoride, $CaF_2$
  0 – 6% calcium carbonate, $CaCO_3$ 0 – 2% of silica, $SiO_2$
0 – 2% of potassium titanate.

The mixture is formed into a paste by mixing it with a 30° Beaume solution of sodium silicate at a rate of 4 to 12 grams of solution for 100 grams of mixture. The paste is baked at 600° C for 105 to 150 minutes. The resulting product is introduced within a sheath of low-carbon (minimum 0.03% carbon, maximum 0.09% carbon) or low-alloy (minimum 0.1% alloying metal, maximum 10% alloying metal) steel, at a filling rate of 30 to 60 grams of paste into each 100 grams of sheath.

In an alternate, iron silicate, FeSi, is replaced to an extent up to 7% maximum of the total weight of all powders by calcium silicate, CaSi.

In another alternate, calcium fluoride, $CaF_2$, is replaced to an extent up to 10% maximum of the total weight of all powders by sodium fluoride, NaF.

In another alternate calcium carbonate, $CaCO_3$, is replaced to an extent up to 5% maximum of the total weight of all powders by another alkaline-earth carbonate.

In another alternate calcium carbonate is replaced to an extent up to 5% maximum of the total weight of all powders by magnesium oxide, MgO.

In another alternate silica, $SiO_2$, is replaced by aluminum oxide, $Al_2O_3$.

In another alternate silica is replaced by potassium feldspar.

In another alternate, iron powder in an amount up to 10% of the total weight of all powders is replaced specifically by powder of alloying metals of the group comprising nickel, molybdenum and chrome.

In view of my invention and disclosure, variations and modifications to meet individual whim or particular need will doubtless become evident to others skilled in the art, to obtain all or part of the benefits of my invention without copying the process and product shown, and I therefore claim all such insofar as they fall within the reasonable spirit and scope of my claims.

Having thus described my invention what I claim as new and desire to secure by Letters Patent is:

1. Flux-cored wire for automatic or semi-automatic electric arc welding of low-carbon or low-alloy steel as obtained by using the following manufacturing process comprising the following successive steps:
   1. Preparing a powder mixture of a composition falling within the following weight limits:
      46 to 84% of powder of the class consisting of iron and iron having up through 10% of the weight of the total powder mixture of alloy;
      4 to 8% of refined ferromanganese having from 80 through 85% of its composition manganese;
      2 to 8% of powder of the class consisting of ferrosilicon, alone, having 45% silicon, and as another category within the class a chemical consisting of calcium silicon, CaSi, up to 7% of the total powder mixture and also optionally ferrosilicon, FeSi, with the calcium silicon, CaSi, to make the rest of the particular amount within the above range of 2 to 8%;
      10 to 20% of powder of the class consisting of calcium fluoride, $CaF_2$, alone and as another category within the class a chemical consisting of sodium fluoride, NaF up to 10% of the total powder mixture and also optionally calcium fluoride, $CaF_2$, with the sodium fluoride, NaF, to make the rest of the particular amount within the above range of 10 to 20%;
      0 to 6% of powder of the class consisting of calcium carbonate, $CaCO_3$, alone and as another category within the class a chemical which consists of another alkaline earth carbonate up to 5% of the total powder mixture, and/or magnesium oxide, MgO, up to 5% of the total powder mixture and also optionally calcium carbonate, $CaCO_3$, with the other alkaline earth carbonate and/or the magnesium oxide, MgO, to make the rest of the particular amount within the above range of 0 to 6%;
      0 to 2% of powder of the class consisting of $SiO_2$, $Al_2O_3$, potassium feldspar and mixtures of $SiO_2$ and one of the other two;
      0 to 2% of potassium titanate;
   2. Mixing the foregoing mixture into a 30° Be solution of soluble silicate at the rate of 4 to 12 grams of solution for 100 grams of the foregoing mixture;
   3. Baking the resultant product of 600° C for from 105 through 150 minutes;
   4. Introducing the resultant product within a sheath of low-carbon (from 0.03% carbon through 0.09% carbon) or low-alloy (from 0.1% of alloying metal through 10% alloying metal) steel, in the proportion of from 30 through 60 grams of the product for each 100 grams of the sheath.

2. A flux-cored wire of claim 1, in which the mixtures does not include calcium silicate, sodium fluoride, magnesium oxide, other alkaline-earth carbonates besides calcium carbonate, potassium feldspar or aluminum oxide.

3. A flux-cored wire of claim 1, in which the mixture includes aluminum oxide.

4. A flux-cored wire of claim 1, in which the mixture includes potassium feldspar.

5. A flux-cored wire of claim 1, in which the mixture includes another alkaline-earth carbonate than calcium carbonate.

6. A flux-cored wire of claim 1, in which the mixture includes magnesium oxide.

7. A flux-cored wire of claim 1, in which the mixture includes sodium fluoride.

8. A flux-cored wire of claim 1, in which the mixture includes calcium silicon.

9. A flux-cored wire of claim 1, in which the mixture includes alloying metals of the group comprising nickel, molybdenum and chromium.

10. A flux-cored wire of claim 1, in which the powder mixture has the following composition by weight:
   65.5% iron powder
   6.0% refined ferro-manganese
   7.5% ferrosilicon (45% Si)
   13.0% calcium fluoride
   6.0% calcium carbonate
   1.5% silicon dioxide
   0.5 potassium titanate.

* * * * *